(12) United States Patent
Yim et al.

(10) Patent No.: US 11,623,345 B2
(45) Date of Patent: *Apr. 11, 2023

(54) MODULAR ROBOT SYSTEM

(71) Applicant: RoboRisen Co., Ltd., Seoul (KR)

(72) Inventors: Sang Bin Yim, Seoul (KR); Hyun Soo Kim, Yongin-si (KR)

(73) Assignee: RoboRisen Co., Ltd., Seoul (KR)

( * ) Notice: Subject to any disclaimer, the term of this patent is extended or adjusted under 35 U.S.C. 154(b) by 212 days.

This patent is subject to a terminal disclaimer.

(21) Appl. No.: 17/059,957

(22) PCT Filed: May 24, 2019

(86) PCT No.: PCT/KR2019/006281
§ 371 (c)(1),
(2) Date: Nov. 30, 2020

(87) PCT Pub. No.: WO2019/231182
PCT Pub. Date: Dec. 5, 2019

(65) Prior Publication Data
US 2021/0252701 A1 Aug. 19, 2021

(30) Foreign Application Priority Data
May 30, 2018 (KR) ........................ 10-2018-0061985

(51) Int. Cl.
*B25J 9/16* (2006.01)
(52) U.S. Cl.
CPC ........... *B25J 9/1617* (2013.01); *B25J 9/1656* (2013.01)
(58) Field of Classification Search
CPC . B25J 9/1617; B25J 9/1656; B25J 9/08; B25J 9/126; B25J 9/1602; B25J 9/1615;
(Continued)

(56) References Cited

U.S. PATENT DOCUMENTS 6,636,781 B1* 10/2003 Shen ...................... B08B 9/045
    703/2
6,725,128 B2* 4/2004 Hogg ...................... G06N 3/008
    702/182
(Continued)

FOREIGN PATENT DOCUMENTS

JP    2017-135961    8/2017
KR    10-0734281    7/2007
(Continued)

OTHER PUBLICATIONS

U.S. Appl. No. 17/059,463,Claims,2020-11-29.pdf (Nov. 29, 2020 Claims, U.S. Appl. No. 17/059,463) (Year: 2020).*
(Continued)

*Primary Examiner* — Bao Long T Nguyen
(74) *Attorney, Agent, or Firm* — H.C. Park & Associates, PLC

(57) ABSTRACT

A modular robot system can be formed by assembling a plurality of cube type unit robots. The modular robot system includes N cube type unit robots, wherein: one of the N cube type unit robots serves as a central control terminal, the cube type unit robot serving as the central control terminal assigns a distinguishable ID number to each of the N cube type unit robots; each robot including a cube-shaped housing, a step motor and a control unit installed inside the housing; the housing has one surface including a mounting groove to allow a rotational body rotating by a rotation shaft of the step motor to be mounted therein, and the other surface including a connection groove in the same shape as the mounting groove; and different cube type unit robots can be connected to each other by means of a connection body mounted in the connection groove.

8 Claims, 17 Drawing Sheets

(58) Field of Classification Search
CPC .. A63H 2200/00; A63H 33/042; A63H 33/04; A63H 33/067; A63H 33/08; G05B 19/0426; G05B 19/0421; G05B 2219/39386; G05B 2219/39163; G05B 2219/39146

See application file for complete search history.

(56) References Cited

U.S. PATENT DOCUMENTS

| | | | |
|---|---|---|---|
| 7,541,768 | B2 | 6/2009 | Kim et al. |
| 10,456,905 | B2 | 10/2019 | Shin |
| 10,507,586 | B2 | 12/2019 | Tokuda |
| 2007/0096679 | A1 | 5/2007 | Kim et al. |
| 2013/0131864 | A1 | 5/2013 | Jody et al. |
| 2018/0193998 | A1 | 7/2018 | Shin |
| 2019/0337159 | A1 | 11/2019 | Tokuda |
| 2021/0162585 | A1* | 6/2021 | Yang ............ B25J 13/088 |

FOREIGN PATENT DOCUMENTS

| | | |
|---|---|---|
| KR | 10-1696151 | 1/2017 |
| KR | 10-2017-0051025 | 5/2017 |
| KR | 10-1745629 | 6/2017 |
| KR | 10-2017-0085667 | 7/2017 |
| KR | 10-1786447 | 11/2017 |
| KR | 10-1839772 | 3/2018 |
| WO | 2019/231181 | 12/2019 |

OTHER PUBLICATIONS

U.S. Appl. No. 17/276,022,Claims,2021-03-12.pdf (Mar. 12, 2021 Claims, U.S. Appl. No. 17/276,022) (Year: 2021).*
International Search Report dated Sep. 11, 2019, issued in International Application No. PCT/KR2019/006281 (with English Translation).

* cited by examiner

| Cube No. | 1 | 2 | 3 | 4 |
|---|---|---|---|---|
| Control sequence | 30 | 60 | -30 | 60 |
| | 30 | -30 | -30 | 90 |
| | 30 | 90 | -30 | 120 |
| | 30 | 60 | -30 | 60 |
| | 30 | -30 | -30 | 90 |
| | 30 | 90 | -30 | 120 |
| | . | . | . | . |
| | . | . | . | . |
| | 1000-1 | 1000-2 | 1000-3 | 1000-4 |

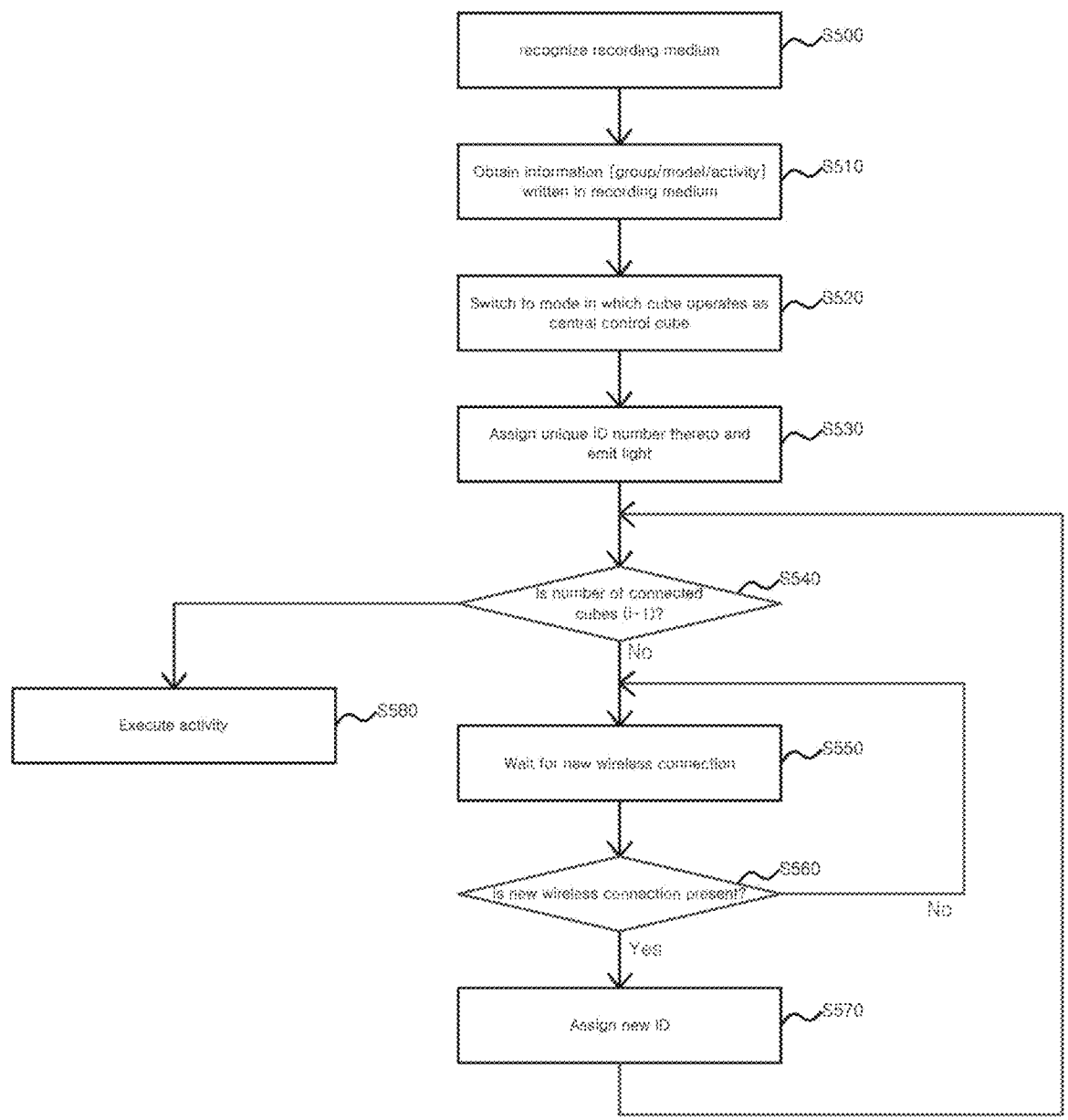

MODULAR ROBOT SYSTEM

CROSS-REFERENCE TO RELATED APPLICATION

This application is a National Stage Entry of International Application No. PCT/KR2019/006281, filed on May 24, 2019, and claims priority from and the benefit of Korean Patent Application No. 10-2018-0061985, filed on May 30, 2018, each of which is hereby incorporated by reference for all purposes as if fully set forth herein.

BACKGROUND

Field

Exemplary embodiments of the invention relate generally to . . . .
The present invention relates to a modular robot system which can be configured by assembling a plurality of cube type unit robots.

Discussion of the Background

Multiple toys having a robot shape have been released recently and become popular to children and teenagers. The toy robot refers to a robot for use in a toy, which is produced to automatically perform a given operation through the supply of power, such as electricity. In general, such robot toys have a finished product form. There is a good possibility that children and teenagers may lose interest in the robot toys because most of the robot toys have stereotypic and monotonous movements.

Meanwhile, other robot toys have been released which can be assembled in order to implement various appearances and movements. To this end, since each block performs a specific function, all blocks necessary for a corresponding robot are required for a user to assemble various robots. In order to produce a robot having another function or movement, an additional block must be purchased. Accordingly, there is a disadvantage in that expenses are very high.

The above information disclosed in this Background section is only for understanding of the background of the inventive concepts, and, therefore, it may contain information that does not constitute prior art.

SUMMARY

The present invention is to provide a modular robot system capable of performing various shapes and functions and constituting a robot capable of a complicated movement by assembling modulated unit blocks having a simple form.

Additional features of the inventive concepts will be set forth in the description which follows, and in part will be apparent from the description, or may be learned by practice of the inventive concepts.

According to an aspect of the present invention, there is provided a modular robot system including N (wherein N is an integer equal to or greater than 2) cube type unit robots, wherein any one of the N cube type unit robots acts as a central control terminal, the cube type unit robot acting as the central control terminal assigns a different unique ID number to each of the N cube type unit robots, each of the N cube type unit robots includes a housing having a cube shape, a step motor installed within the housing, and a control unit installed within the housing to control the step motor, a mounting groove on which a rotating body rotated by a rotation shaft of the step motor is mounted is formed in one side of the housing, a connection groove having the same shape is formed in the other side of the housing, each cube type unit robot is connected to another cube type unit robot through a connection body mounted on the connection groove, and the control unit performs a step motor control sequence corresponding to the unique ID number of the cube type unit robot among predefined N step motor control sequences (wherein N unique ID numbers transmitted to the respective N cube type unit robots and the predefined N step motor control sequences correspond to each other in a one-to-one manner).

In one embodiment, each of the N cube type unit robots may further include a recognition device capable of recognizing information stored in a given recording medium. When the recording medium is recognized by any one of the recognition devices included in the N cube type unit robots, a cube type unit robot including the corresponding recognition device may act as the central control terminal.

In one embodiment, each of the N cube type unit robots may further include a recognition device capable of recognizing information transmitted by an external remote controller. When the information transmitted by the remote controller is recognized by any one of the recognition devices included in the N cube type unit robots, a cube type unit robot including the corresponding recognition device may act as the central control terminal.

In one embodiment, the cube type unit robot may further include a light-emitting body which emits light through a light-emitting area formed in the housing. The control unit may control the light-emitting body so that light having a color corresponding to a unique ID number assigned to the cube type unit robot is emitted through the light-emitting area.

In one embodiment, the control unit may store a descriptor of each of the predefined N step motor control sequences, may extract, from a stored lookup table, a step motor control sequence descriptor corresponding to a unique ID number of the cube type unit robot, and may perform the step motor control sequence based on the extracted step motor control sequence descriptor.

In one embodiment, the descriptor of each of the N step motor control sequences may include a list of the number of pulses per unit time.

In one embodiment, the cube type unit robot acting as the central control terminal may transmit, to each of the N cube type unit robots, a step motor control sequence descriptor corresponding to a unique ID number corresponding to the corresponding cube type unit robot. The control unit may perform the step motor control sequence based on the step motor control sequence descriptor transmitted to the cube type unit robot.

In one embodiment, the cube type unit robot acting as the central control terminal may transmit synchronization information to each of the N cube type unit robots, and may transmit a control sequence start command to each of the N cube type unit robots after transmitting synchronization information to all of the N cube type unit robots. The synchronization information may include synchronization reference timing measured based on a timer operating in the central control terminal. The control sequence start command may include start timing calculated based on the timer operating in the central control terminal. The control unit may start its own timer when the synchronization information is transmitted to the cube type unit robot, and may perform the step motor control sequence at start timing included in the control sequence start command using synchronization reference timing included in the synchronization information and the its own timer when the control sequence start command is transmitted to the cube type unit robot.

According to one embodiment of the present invention, there can be provided a modular robot system capable of configuring a robot capable of complicated and various movements by assembling modulated unit robots having a simple form.

Furthermore, robots having various forms can be implemented by making different an assembly method or parts of a cube type unit robot, that is, a unit. That is, according to the technical spirit of the present invention, there is an effect in that a completed modular robot having various forms can be implemented by combining cubes having a simple form in several manners.

Furthermore, there is an effect in that various movements can be implemented by adjusting only a step motor control sequence to be performed by each cube type unit robot.

Meanwhile, a modular robot according to an embodiment of the present invention can be applied to toys. A modular robot having a toy shape can perform various movements depending on an assembly method. Accordingly, there is an effect in that children who play with the modular robot can have greater interest and can develop their creativity.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 8 is a diagram illustrating an example of a lookup table including the descriptor of a step motor control sequence.

FIG. 11B is a flowchart illustrating a process of selecting a central control cube and connecting the central control cube and peripheral cubes from a viewpoint of the central control cube.

DETAILED DESCRIPTION

Figure 1A:
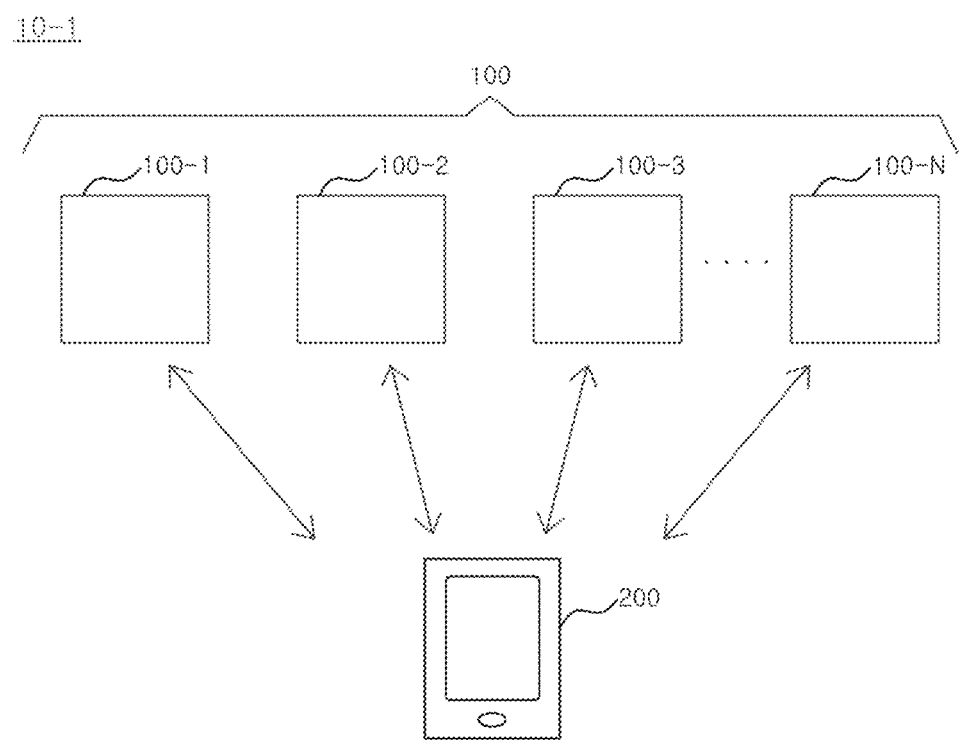
FIG. 1A and FIG. 1B are diagrams schematically illustrating a configuration of a modular robot system according to one embodiment of the present invention.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

The present invention may be modified in various ways and may have various embodiments. Specific embodiments are to be illustrated in the drawings and are to be described in the detailed description in detail. It is however to be understood that the present invention is not intended to be limited to the specific embodiments, but that includes all of modifications, equivalents and/or substitutions which fall within the spirit and technological scope of the present invention. In describing the present invention, a detailed description of the known technologies will be omitted if it is deemed to make the gist of the present invention unnecessarily vague.

Terms, such as a first and a second, may be used to describe various elements, but the elements should not be restricted by the terms. The terms are used to only distinguish one element from the other element.

The terms used in this application are used to merely describe specific embodiments and are not intended to restrict the present invention. An expression of the singular number includes an expression of the plural number unless clearly defined otherwise in the context.

In this specification, a term, such as "include or "have", is intended to designate that a characteristic, a number, a step, an operation, an element, or a part described in the specification, or a combination of them exists, and should be understood that it does not exclude the existence or possible addition of one or more other characteristics, numbers, steps, operations, elements, parts, or combinations of them in advance.

Furthermore, in this specification, if one element "transmits" data to the other element, this means that one element may directly transmit the data to the other element or may transmit the data to the other element through at least another element. In contrast, if one element "directly transmits" data to the other element, this means that the data is transmitted from one element to the other element without the intervention of another element.

Hereinafter, the present invention is described in detail based on embodiments of the present invention with reference to the accompanying drawings. The same reference numerals proposed in the drawings denote the same member.

Figure 1B:
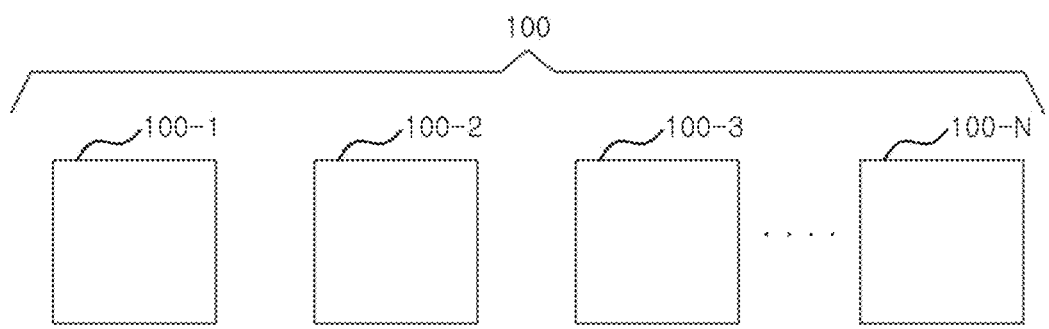

FIGS. 1A and 1B are schematically illustrating configurations of a modular robot system according to one embodiment of the present invention, respectively.

FIG. 1A illustrates a modular robot system operating in a first mode. FIG. 1B illustrates a modular robot system operating in a second mode. Hereinafter, for convenience sake, a first mode is called an external control mode, and a second mode is called a self mode, but the name of each mode does not restrict the scope of right of the present invention.

First, referring to FIG. 1A, a modular robot system 10-1 operating in the external control mode according to one embodiment of the present invention may include N (N is an integer equal to or greater than 2) cube type unit robots 100-1 to 100-N. The N cube type unit robots may be combined to constitute a single modular robot.

The modular robot system 10-1 may further include a central control terminal 200 that controls the N cube type unit robots 100-1 to 100-N.

The central control terminal 200 may assign unique ID numbers to the N cube type unit robots 100-1 to 100-N, respectively, and may control each of the cube type unit robots 100-1 to 100-N to perform a designated action.

The central control terminal 200 may be any data processing device that processes calculation or data or receives and processes input data, stores and processes corresponding information, and outputs results. For example, the central control terminal 200 may be a data processing device, which may be called a general-purpose computer, a personal computer, a server, a mobile terminal, a mobile terminal unit, a remote station, a remote terminal unit, an access terminal unit, a terminal unit, a communication device, a communication terminal, a user agent, a user device, or a user equipment (UE), a terminal, a laptop computer, a tablet PC, a smartphone, a personal digital assistant (PDA), etc.

The central control terminal 200 may perform wireless communication with the N cube type unit robots 100-1 to 100-N. The central control terminal 200 may perform wireless communication with the N cube type unit robots 100-1 to 100-N using wireless communication methods of various methods. For example, the wireless communication method may include Wi-Fi, Magnetic Secure Transmission (MST), Bluetooth communication, Near Field Communication (NFC), Radio Frequency Identification (RFID), ZigBee, Z-Wave, Infrared (IR) communication, etc.

Furthermore, the N cube type unit robots 100-1 to 100-N may perform wireless communication with each other using the aforementioned wireless communication methods. In this case, the wireless communication methods used by the central control terminal 200 and the N cube type unit robots 100-1 to 100-N may be the same.

Hereinafter, for convenience of description, an example in which the central control terminal 200 and the N cube type unit robots 100-1 to 100-N perform wireless communication using Bluetooth is chiefly described, but the technical spirit of the present invention is not limited thereto.

Meanwhile, each of the N cube type unit robots 100-1 to 100-N has a cube shape of a regular hexahedron, and all of them may have the two same size. The cube type unit robots 100-1 to 100-N may be combined through a given connection body. The entire body in which all of the N cube type unit robots 100-1 to 100-N are assembled may constitute a one modular robot system.

Referring to FIG. 1b, a modular robot system 10-2 operating in the self mode according to one embodiment of the present invention may include N (N is an integer equal to or greater than 2) cube type unit robots 100-1 to 100-N.

In the case of the self mode, the modular robot system 10-2 does not include the central control terminal (refer to 200 in FIG. 1A), and any one of the N cube type unit robots 100-1 to 100-N may perform a role of the central control terminal. That is, in the case of the self mode, the central control terminal may assign unique ID numbers to the N cube type unit robots 100-1 to 100-N, respectively, and may control each of the cube type unit robots 100-1 to 100-N to perform a designated action.

A terminal acting as a central control terminal among the N cube type unit robots 100-1 to 100-N is called a central control cube, and the remaining (N−1) cube type unit robots except the central control cube is called a peripheral cube. A central control cube among the N cube type unit robots 100-1 to 100-N may be determined in a given manner. This is described in detail later.

The N cube type unit robots 100-1 to 100-N may perform wireless communication with each other using wireless communication methods of various methods. For example, the wireless communication method may include Wi-Fi, Magnetic Secure Transmission (MST), Bluetooth communication, Near Field Communication (NFC), Radio Frequency Identification (RFID), ZigBee, Z-Wave, Infrared (IR) communication, etc.

If the wireless communication method is Bluetooth, a central control terminal becomes a master, and a peripheral terminal becomes a slave.

As in the external control mode, in the case of the self mode, each of the N cube type unit robots 100-1 to 100-N has a cube shape of a regular hexahedron, and all of them may have the same size. The cube type unit robots 100-1 to 100-N may be combined through a given connection body. The entire body in which all of the N cube type unit robots 100-1 to 100-N are assembled may constitute a one modular robot system.

Hereinafter, a cube type unit robot according to one embodiment of the present invention is more specifically described with reference to FIGS. 2 to 4.

Figure 2:
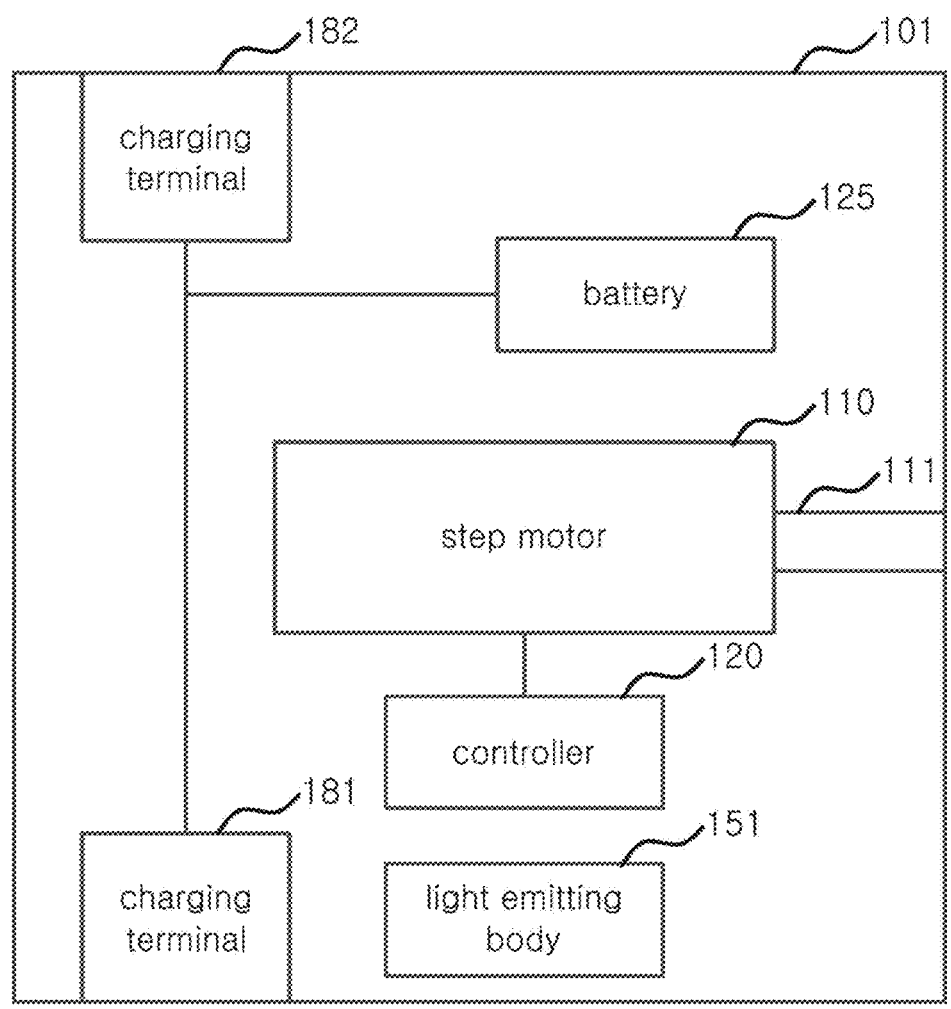
FIG. 2 is a block diagram for describing a configuration of a cube type unit robot that constitutes the modular robot system according to one embodiment of the present invention.

FIG. 2 is a block diagram for describing a configuration of a cube type unit robot that constitutes the modular robot system according to one embodiment of the present invention.

As illustrated in FIG. 2, the cube type unit robot 100 (hereinafter referred to as a "cube") may include a housing 101, and may include a step motor 110 and a control unit 120 installed within the housing 101. According to an embodiment, the cube 100 may further include a battery 125, a light-emitting body 151, a recognition device 152, and one or more charging terminals 181 and/or 182. The cube 100 according to an embodiment may further include another element in addition to the elements illustrated in FIG. 2.

The step motor 110 may be called a stepper motor or a stepping motor, and may mean a brushless DC electric motor which can divide one rotation of a wheel by multiple steps. The step motor 110 may rotate a rotating body mounted on the rotation shaft 111.

The step motor 110 may include a 2-phase step motor and a multi-phase step motor. Furthermore, the step motor 110 may include a Variable Reluctance (VR) type, a Permanent Magnet (PM) type, and a hybrid type.

In one embodiment, multiple saw-toothed electromagnets may be positioned in the step motor 110 around a metal gear. In this case, the electromagnet is driven by a current from an external control circuit (e.g., the control unit 120), such as a microcontroller. In order to rotate the rotation shaft 111 of the step motor 110, first, electric power is applied to one electromagnet, which pulls the teeth of gears toward the electromagnet. When the teeth of the gears are arranged in a first electromagnet in a straight line, the gears slowly lean toward a next electromagnet. Accordingly, when power is applied to the next electromagnet, the previous electromagnet is turned off. The teeth of the gears become a straight line with the next electromagnet. Such actions are repeated. In this case, each action of rotation is called a "step." Many steps produce the entire rotation. Accordingly, the motor can be precisely rotated at a given angle.

The control unit 120 may control operations and/or resources of various elements (e.g., the step motor 110 and the light-emitting body 151) included in the cube 100.

The control unit 120 may be a microcontroller or an embedded device that includes a processor and a memory. The control unit 120 may further include a communication module capable of wireless communication with the central control terminal 200 and/or another cube.

The processor included in the control unit 120 may include a CPU, a GPU, an MCU, a microprocessor, etc. The memory included in the control unit 120 may store various data, such data received/input from the outside and data generated by the control unit 120, and a computer program. The memory may include a volatile memory and a nonvolatile memory. The memory may include, for example, a flash memory, a ROM, a RAM, an EEROM, an EPROM, an EEPROM, a solids state disk (SSD), and a register. Or the memory may include a file system, a database, and an embedded database.

Meanwhile, according to an implementation example, a protrusion may be formed within the rotation shaft 111 of the step motor 110. The formed protrusion may be used for the control unit 120 to be aware of a rotation starting point of the rotation shaft 111. Specifically, the control unit 120 may include a sensor capable of recognizing the protrusion, and may recognize, as a starting point, a point at which the protrusion is recognized.

A function performed by the control unit 120 in order to realize the technical spirit of the present invention is more specifically described later.

The battery 125 may supply power to various elements (e.g., the step motor 110, the control unit 120, and the light-emitting body 151) included in the cube 100. The battery 125 may be charged by an external power source that comes into contact with the charging terminal 181 and/or 182.

The light-emitting body 151 may emit light. The light-emitting body 151 may be, for example, a Light Emitting Diode (LED). The light-emitting body 151 may emit light in various colors under the control of the control unit 120. Furthermore, the light-emitting body 151 may perform a light-emitting operation (flickering) or continuously emitting light (lighting) under the control of the control unit 120.

In one embodiment the light-emitting body 151 may emit light through a light-emitting area formed in the housing 101, so that the emission of the light is recognized on the outside.

The recognition device 152 may be a device capable of recognizing information recorded on a given recording medium. A detailed implementation of the recognition device 152 may be dependent on the recording medium. According to an embodiment, the recording medium may be a tag on which barcode or a QR code is printed, an RFID tag, a chip or a memory device.

In another embodiment, the recognition device 152 may be a device capable of detecting a radio signal transmitted by an external remote controller and recognizing information included in the radio signal. If a remote controller uses an infrared communication signal, the recognition device 152 may be an infrared sensor.

Figure 3:
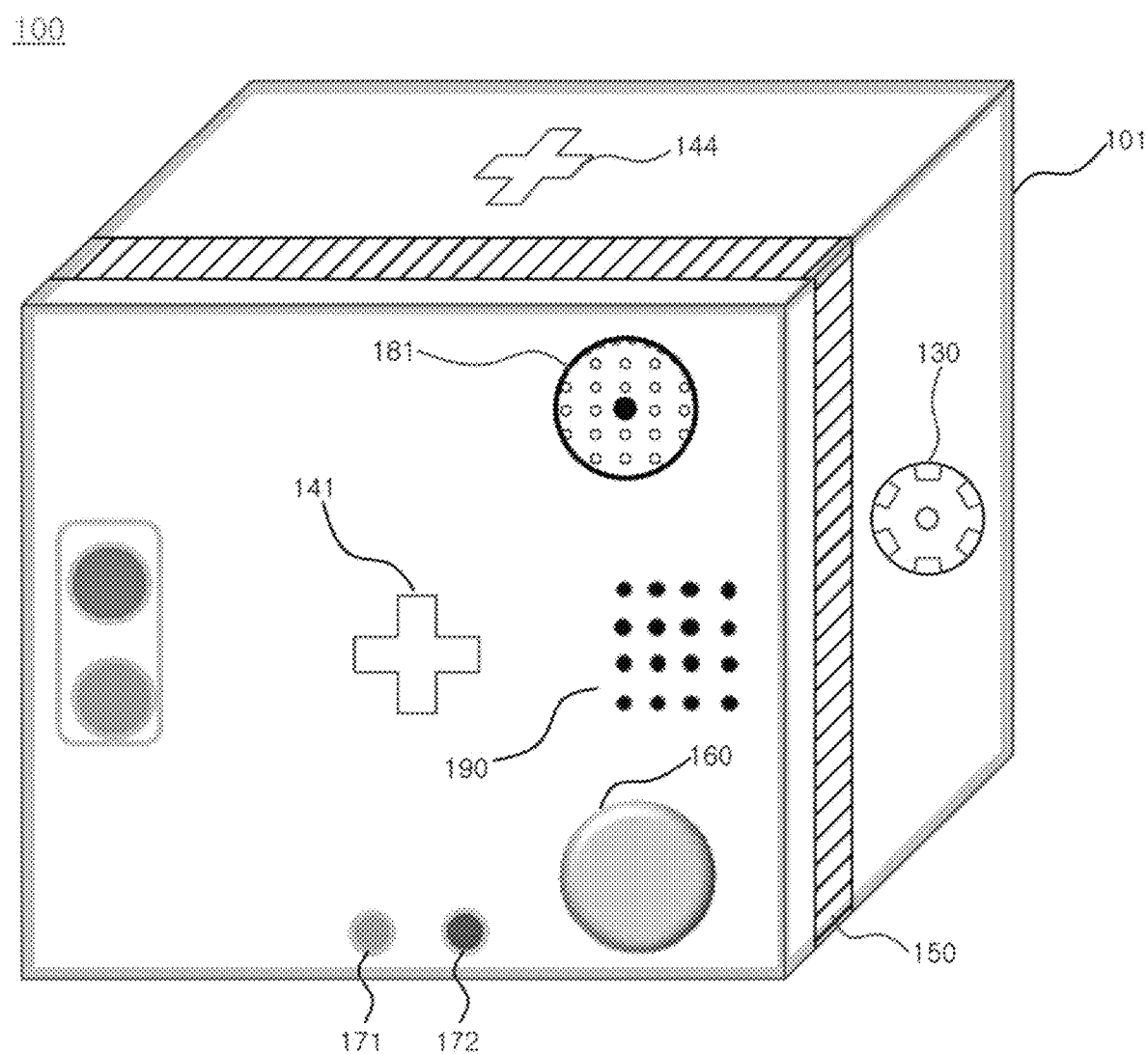
FIG. 3 is a diagram illustrating a general appearance of the cube type unit robot that constitutes the modular robot system according to one embodiment of the present invention.

FIG. 3 is a diagram illustrating an overall appearance of the cube type unit robot that constitutes the modular robot system according to one embodiment of the present invention. FIG. 4 is a diagram illustrating the sides of the cube type unit robot that constitutes the modular robot system according to one embodiment of the present invention. Views (a) to (f) of FIG. 4 sequentially illustrate the front, the rear, the left side, the right side, the plane, and the bottom.

Referring to FIG. 3, the cube type unit robot (hereinafter referred to as "cube") may include the housing 101 having a cubic shape. Meanwhile, as described above, the step motor 110 may be installed within the housing 101 (refer to FIG. 2).

Figure 4:
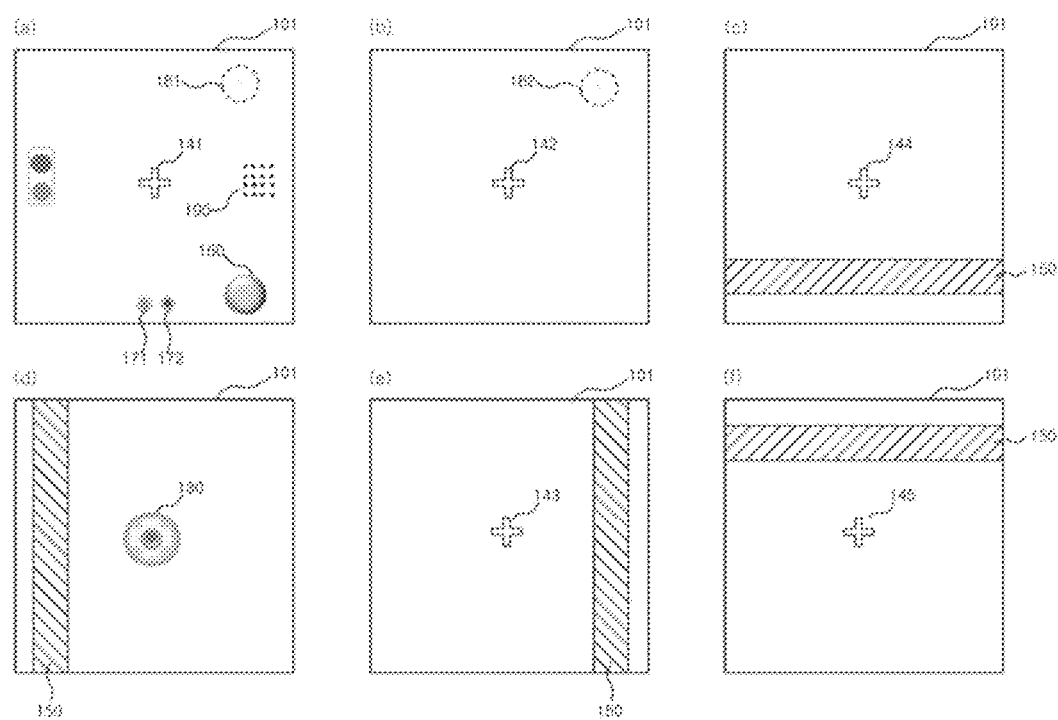
FIG. 4 is a diagram illustrating the views (a), (b), (c), (d), (e), and (f) of sides of a cube type unit robot that constitutes the modular robot system according to one embodiment of the present invention.

As illustrated in FIG. 3 and view (d) of FIG. 4, a mounting groove 130 on which a rotating body rotated by the rotation shaft 111 of the step motor 110 may be mounted on one side of the housing 101. The rotating body mounted on the mounting groove 130 may be a wheel or a propeller, for example. The rotating body may be formed in various sizes and shapes, but may in common include a mounting portion to be mounted on the mounting groove 130.

As illustrated in FIG. 3 and views (a) to (c), and (e) to (f) of FIG. 4, connection grooves 141 to 145 may be formed in the remaining five sides of the housing 101. All of the connection grooves 141 to 145 formed in the five sides may have the same shape. For example, the connection grooves 141 to 145 may have the same cross shape, but the technical spirit of the present invention is not limited thereto.

A given connection body may be mounted on the connection grooves 141 to 145. The connection body may be a part or an accessory which may be connected to the cube 100.

The connection body may be formed in various sizes and shapes, but may in common include a mounting portion to be mounted on any one of the connection grooves 141 to 145. For example, if each of the connection grooves 141 to 145 has an engraving shape having a cross form, the mounting portion of the connection body may have an embossing shape having the same cross form. Meanwhile, some connection body may include two or more mounting portions. The connection body may perform a function for connecting two or more cubes 100.

Hereinafter, the rotating body and the connection body are collectively called a part.

Meanwhile, according to an embodiment, a light-emitting area 150 may be formed in the housing 101. The cube 100 may further include a button 160, state indication LEDs 171 and 172 and/or a speaker 190.

The light-emitting area 150 may be an area through which light formed by the light-emitting body 151 is emitted. FIGS. 3 and 4 illustrate an example in which the light-emitting area 150 is formed in a belt form in the remaining sides except the front and rear of the housing 101, but the location, form or size of the area is not specially limited. According to an embodiment, the light-emitting area 150 having various forms and shapes may be formed at various locations.

The button 160 may be used for a user to turn on or off the cube 100.

Or the button 160 may be used to change a mode of the cube 100. For example, in the state in which power has been off, when the button 160 is pressed for a given time (e.g., 3 seconds) or more, power becomes on and the state of the cube 100 may become a standby state. In the standby state, when the button 160 is pressed, all of the state indication LEDs 171 and 172 are turned off, and a mode of the cube 100 may switch to a sleep mode.

The state indication LEDs 171 and 172 may emit light having different colors. For example, the state indication LED 171 may be a blue LED, and the state indication LED 172 may be a green LED.

The state indication LEDs 171 and 172 may display various visual effects indicative of a state of the cube 100 under the control of the control unit 120. For example, the state indication LED 171 may flicker before wireless connection with the central control terminal 200 is completed, and may be turned on after the wireless connection is completed. The state indication LED 172 may be turned on while charged, may be turned off when it is not charged, and may flicker when a state of the battery is a given level or less.

The speaker 190 may output various sounds under the control of the control unit 120.

As illustrated in FIG. 3, and views (a) and (b) of FIG. 4, charging terminals 181 and 182 may be formed in the front and the rear, respectively. The charging terminal 181 may be coupled to an external power source. In some cases, the charging terminal 181 may come into contact with a charging terminal of another cube. For example, if the charging terminal 181 of the first cube 100-1 is coupled to an external power source and another charging terminal 182 comes into contact with the charging terminal 181 of the second cube 100-2, the second cube 100 may be charged by power received through the first cube. In some cases, 3 or more cubes may be sequentially stacked and charged at the same time.

Figure 5:
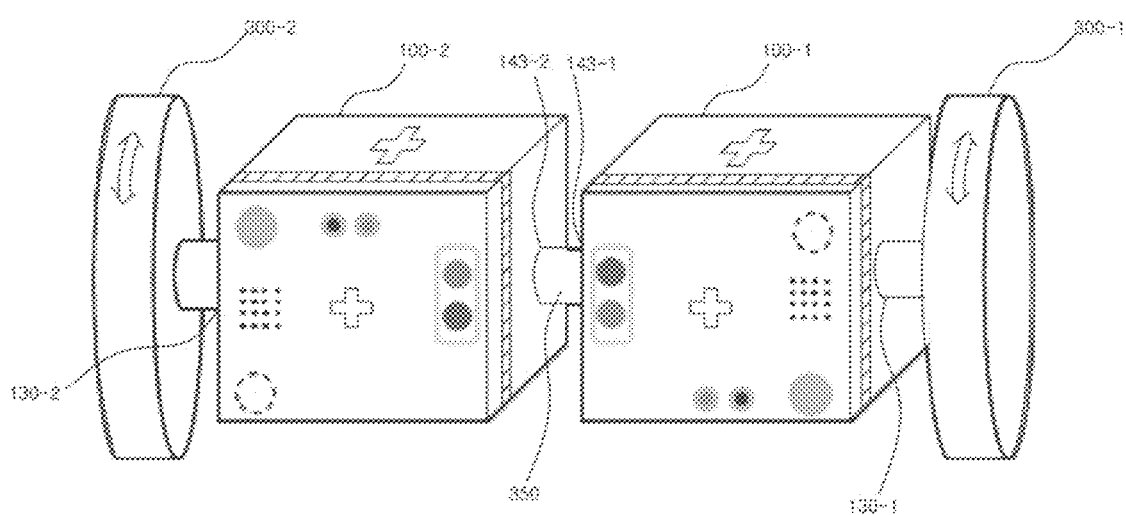
FIG. 5 is a diagram for describing that another cube type unit robot and parts are connected to a cube type unit robot that constitutes the modular robot system according to one embodiment of the present invention.

Meanwhile, the N cube type unit robots 100-1 to 100-N may be combined through the aforementioned connection body. FIG. 5 is a diagram for describing that another cube type unit robot and parts are connected to a cube type unit robot that constitutes the modular robot system according to one embodiment of the present invention.

Referring to FIG. 5, a rotating body 300-1 having a wheel shape may be mounted on a mounting groove 130-1 formed on the right side of the first cube 100-1. A rotating body 300-2 having a wheel shape may also be mounted on a mounting groove 130-2 formed on the right side of the second cube 100-2. The rotating bodies 300-1 and 300-2 may be rotated by the step motors of the cubes 100-1 and 100-2 to which a corresponding rotating body is coupled.

Meanwhile, one connection body 350 may be mounted on the connection groove 130-1 formed on the left side of the first cube 100-1 and the connection groove 130-2 formed on the left side of the second cube 100-2. As described above, the two cubes 100-1 and 100-2 may be coupled through the connection body 350.

In the case of FIG. 5, the two cubes 100-1 and 100-2 coupled together, the rotating bodies 300-1 and 300-2 coupled to the respective cubes, the connection body 350 that connects the two cubes 100-1 and 100-2, and a central control terminal 200 that controls the two cubes 100-1 and 100-2 may constitute a completed one modular robot system.

FIG. 5 merely illustrates a modular robot having a very simple form, for convenience of understanding and description. According to an embodiment, three or more cubes and parts having various forms may be mounted on a modular robot. A robot having very various forms may be implemented by making different an assembly method or parts of a cube, that is, a unit. That is, according to the technical spirit of the present invention, there is an effect in that a completed modular robot having various forms can be implemented by combining cubes having a simple form in various manners.

As described above, in the external control mode (refer to FIG. 1A), the central control terminal 200 is wirelessly connected to a plurality of cubes 100, and may control the cubes 100. Hereinafter, a process of wirelessly connecting the central control terminal 200 and the plurality of cubes 100 is described with reference to FIGS. 6A and 6B.

Figure 6A:
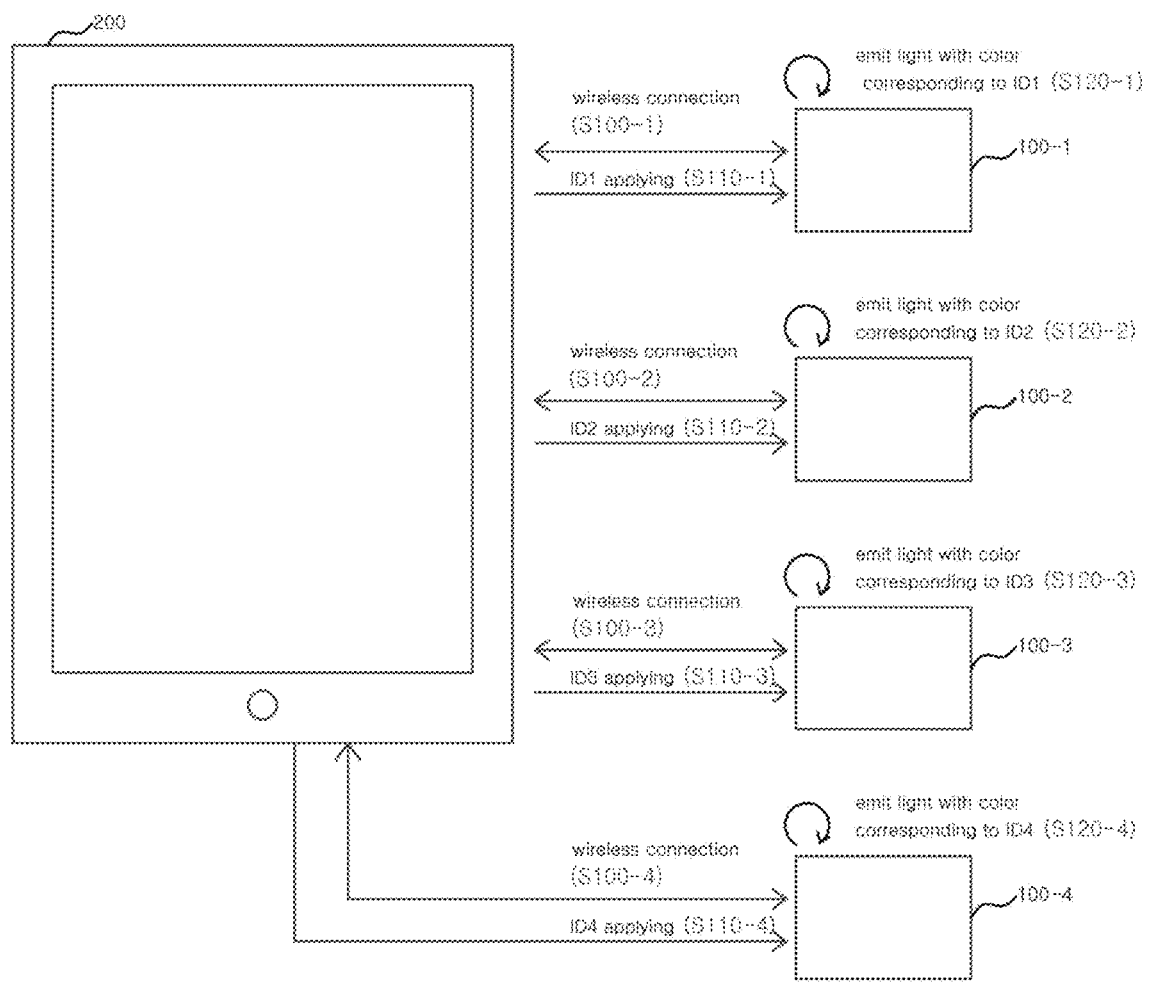
FIG. 6A is a diagram illustrating a process of connecting a central control terminal and a plurality of cubes.

FIG. 6A is a diagram illustrating a process of connecting the central control terminal 200 and the plurality of cubes 100. FIG. 6A illustrates an example in which four cubes are connected.

Referring to FIG. 6A, the central control terminal 200 and the first cube 100-1 may be wirelessly connected using a given wireless communication method (e.g., Bluetooth) (S100-1).

Thereafter, the central control terminal 200 may assign a unique ID number 1 to a cube (i.e., the first cube 100-1) that is first connected thereto (S110-1). The first cube 100-1 to which the unique ID number 1 is assigned may emit light having a color corresponding to the unique ID number 1 (S120-1).

Figure 6B:
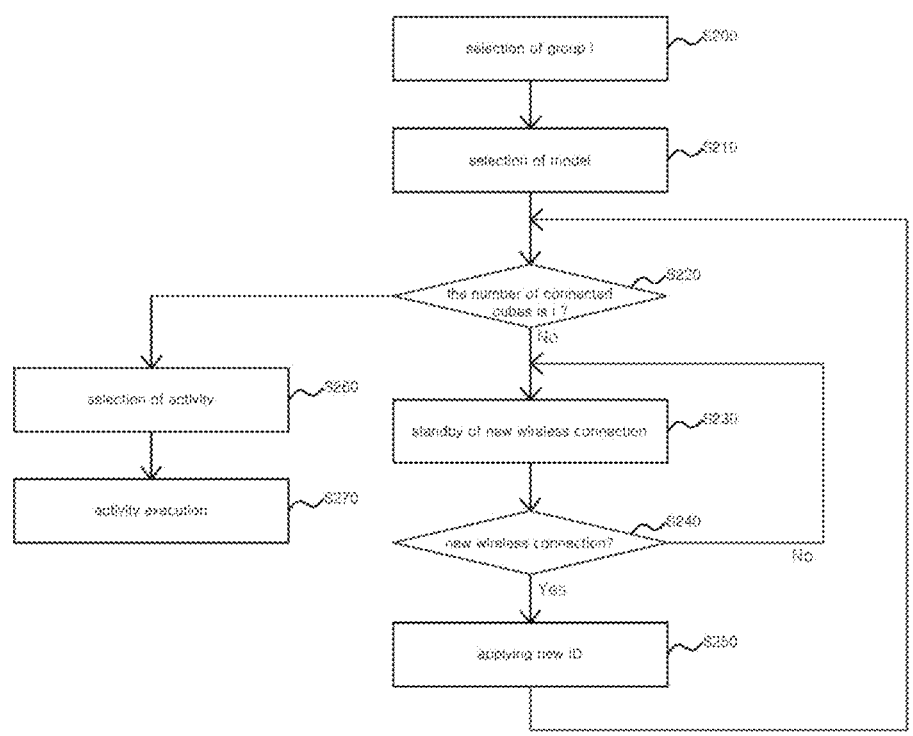
FIG. 6B is a flowchart illustrating a process of connecting the central control terminal and a cube from a viewpoint of the central control terminal.

This is more specifically described as follows. A unique color may be assigned to each unique ID number. For example, red is previously designated in the ID number 1, blue is previously designated in an ID number 2, green is previously designated in an ID number 3, and yellow is previously designated in an ID number 4. The control unit 120 of each cube may previously store such corresponding information. In FIG. 6B, it is assumed that a color corresponding to an ID number has been designated as described above.

A control unit 120-1 included in the first cube 100-1 may receive the unique ID number 1 assigned by the central control terminal 200, and may control a light-emitting body 151-1 to emit light having a color corresponding to the received unique ID number ($ID_1$) through a light-emitting area 150-1. For example, the control unit 120-1 of the first cube 100-1 may enable red light, corresponding to the ID number 1, to be emitted.

Meanwhile, the central control terminal 200 and the second cube 100-2 may be wirelessly connected using a wireless communication method (e.g., Bluetooth) (S100-2).

Thereafter, the central control terminal 200 may assign the unique ID number 2 to a cube (i.e., the second cube 100-2) that is second connected thereto (S110-2). The second cube 100-2 to which the unique ID number 2 is assigned may emit light having a color corresponding to the unique ID number 2 (S120-2). For example, the second cube 100-2 may emit blue light corresponding to the ID number 2.

Meanwhile, the central control terminal 200 and the third cube 100-3 may be wirelessly connected using a wireless communication method (e.g., Bluetooth) (S100-3).

Thereafter, the central control terminal 200 may assign the unique ID number 3 to a cube (i.e., the third cube 100-3) that is third connected thereto (S110-3). The third cube 100-3 to which the unique ID number 3 is assigned may emit light having a color corresponding to the unique ID number 3 (S120-3). For example, the third cube 100-3 may emit green light corresponding to the ID number 3.

Meanwhile, the central control terminal 200 and the fourth cube 100-4 may be wirelessly connected using a wireless communication method (e.g., Bluetooth) (S100-4).

Thereafter, the central control terminal 200 may assign the unique ID number 4 to a cube (i.e., the fourth cube 100-4) that is fourth connected thereto (S110-4). The fourth cube 100-4 to which the unique ID number 4 is assigned may emit a color corresponding to the unique ID number 4 (S120-3). For example, the fourth cube 100-4 may emit yellow light corresponding to the ID number 4.

According to one embodiment of the present invention, each of cubes that constitute one modular robot emits light having a different color corresponding to a unique number designated thereto. Accordingly, there is an effect in that a user can easily distinguish between cubes having the same shape.

FIG. 6B is a flowchart illustrating a process of connecting the central control terminal 200 and the cube 100 from a viewpoint of the central control terminal.

Referring to FIG. 6B, a group i, that is, any one of a group 1 to a group N, may be selected in the central control terminal 200 (S200). The group i (wherein i is an integer where 1<=i<=N) may mean a group of modular robots which may be formed using i cubes. Furthermore, the group i may include at least one model. The model may mean one completed modular robot which may be formed using the i cubes.

Figure 7A:
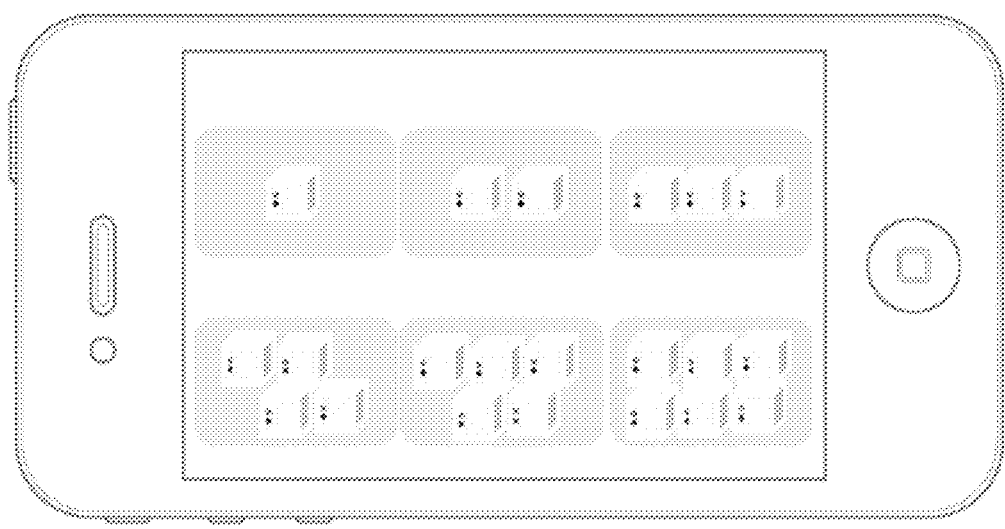
FIG. 7A is a diagram illustrating an example of a group selection UI.

In one embodiment, a user may select a group through a group selection user interface (UI) output by the central control terminal 200. FIG. 7A is a diagram illustrating an example of a group selection UI. In FIG. 7A, the group selection UI may include icons corresponding to the group 1 to the group N, respectively. The user may designate one of the icons and select a group corresponding to the designated icon.

Figure 7B:
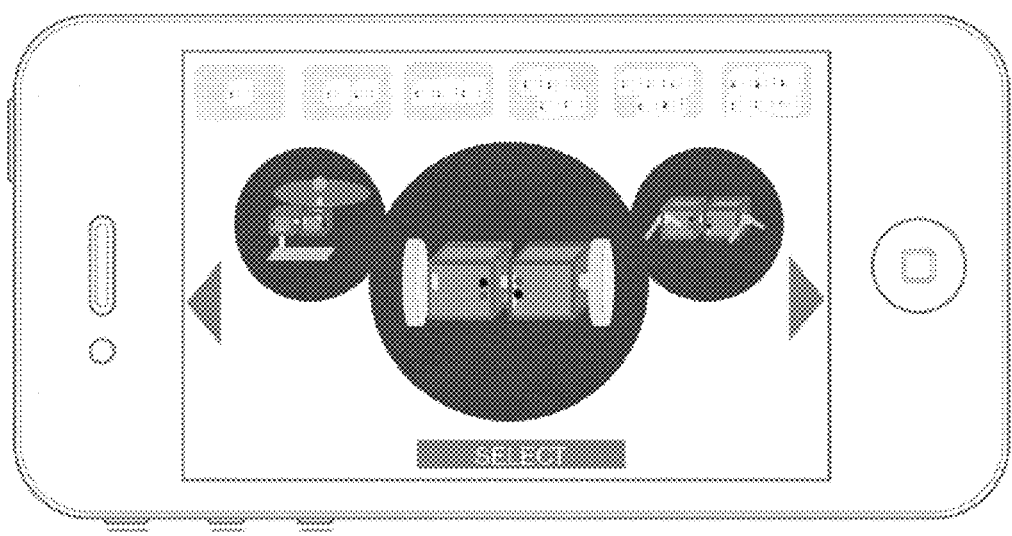
FIG. 7B is a diagram illustrating an example of a model selection UI.

Referring back to FIG. 6B, one of models included in the selected group may be selected in the central control terminal 200 (S210). In one embodiment, the user may select the model through a model selection UI output by the central control terminal 200. FIG. 7B is a diagram illustrating an example of a model selection UI. In FIG. 7B, an example in which the group 2 is selected is taken as an example. In the model selection UI of FIG. 7B, the user may select a desired model.

Referring back to FIG. 6B, the central control terminal 200 may determine whether the number of cubes now connected thereto is i (S220). If the number of cubes now connected thereto is not i, the central control terminal 200 may wait for a wireless connection with a new cube (S230).

If a new cube is wirelessly connected, the central control terminal 200 may assign a new unique ID number to the cube that has been newly wirelessly connected thereto (S240, S250).

Meanwhile, the central control terminal 200 and the cube that has been wirelessly connected and to which the unique ID number has been assigned may emit light having a color corresponding to the assigned unique ID number through the light-emitting area. This has been described above with reference to FIG. 6A.

The central control terminal 200 may be wirelessly connected to the i cubes by repeating such a process.

When the central control terminal 200 is wirelessly connected to the i cubes, one of one or more activities which may be performed by a modular robot corresponding to the model selected at step S210 may be selected (S260). The central control terminal 200 may perform a given control process that enables the selected activity to be performed by the modular robot (S270).

Figure 7C:
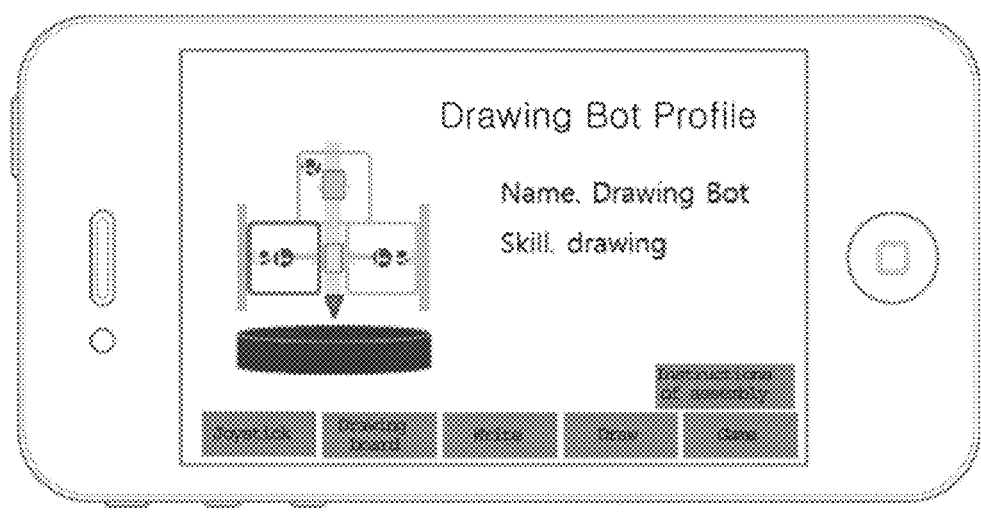
FIG. 7C is a diagram illustrating an example of an activity selection UI.

In one embodiment, a user may select a model through an activity selection UI output by the central control terminal 200. FIG. 7C is a diagram illustrating an example of the activity selection UI. In FIG. 7C, a case where a model named "AutoCar" has been selected is taken as an example. In the example of FIG. 7C, a modular robot corresponding to the "AutoCar" model may include a control activity based on Joystick, a drawing activity that moves while drawing a trajectory having the same shape as a figure drawn by a user, a dance mode activity that moves along a pre-designated trajectory, etc. A user may select one of one or more activities designated to a model.

Data that defines each of the activities may be represented in the form of a lookup table corresponding to a corresponding activity. In this case, the lookup table may include the descriptor of a step motor control sequence corresponding to each of cubes that constitute a modular robot that performs the activity.

The step motor control sequence may be a list of step motor control operations performed by one cube 100 (more accurately, the control unit 120 included in the cube). For example, the step motor control sequence may include a list of the number of pulses per unit time. The descriptor of the step motor control sequence may be data having a storable form for storing the step motor control sequence.

Meanwhile, as described above, a unique ID number has been previously assigned to each cube. Each step motor control sequence may correspond to each unique ID number assigned to each cube.

FIG. 8 is a diagram illustrating an example of a lookup table including the descriptor of a step motor control sequence. In FIG. 8, the lookup table defines a specific activity which may be performed by a modular robot including four cubes.

As illustrated in FIG. 8, the lookup table 1000 for representing one activity may include descriptors 1000-1 to 1000-4 of four step motor control sequences.

The first cube 100-1 to which the ID number 1 has been assigned may perform a first step motor control sequence 1000-1. The second cube 100-2 to which the ID number 2 has been assigned may perform a second step motor control sequence 1000-2. The third cube 100-3 to which the ID number 3 has been assigned may perform a third step motor control sequence 1000-3. The fourth cube to which the ID number 4 has been assigned may perform a fourth step motor control sequence 1000-4.

In the example of FIG. 8, the first cube 100-1 rotates its step motor by 30 pulses per unit time. In contrast, the third cube 100-3 reversely rotates its step motor by 30 pulses per unit time. The second cube 100-2 repeats 60-pulse rotation, 30-pulse reverse rotation, and 90-pulse rotation. The fourth cube repeats 60-pulse rotation, 90-pulse rotation, and 120-pulse rotation.

The step motor control sequence of FIG. 8 is merely an example. There may be a step motor control sequence which has various values and is finely adjusted in response to an activity. Furthermore, the step motor control sequence may have various forms, and may have any form which may individually define the rotating operation of a step motor included in each cube. For example, the step motor control sequence may be configured as a list of <driving time, pulses> values. In this case, one value may indicate the rotation pulses of a step motor for a specific driving time.

As described above, according to one embodiment of the present invention, there an effect in that various movements can be implemented by adjusting only a step motor control sequence to be performed by each cube.

Meanwhile, in another embodiment, the step motor control sequence may also include a list of rotation angles of one step motor based on the starting point of a step motor. For example, the step motor control sequence may have a form, such as [30, 60, 30, −30]. The form defines an operation in which the motor has to rotate and move to a location of 30 degrees from the starting point for the first unit time, the motor has to rotate and move to a location of 60 degrees from the starting point for a next unit time, the motor has to reversely rotate and move to a location of 30 degrees from the starting point for a next unit time, and the motor has to reversely rotate and move to a location of −30 degrees from the starting point for a next unit time.

Meanwhile, in one embodiment, the lookup table including the step motor control sequence descriptors may be stored in the central control terminal 200. In this case, the central control terminal 200 may previously transmit, to a corresponding cube, a step motor control sequence to be performed by the cube before executing an activity.

In another embodiment, the lookup table may be previously stored in each cube (accurately, the control unit 120 of each cube). In this case, each cube may extract a control sequence to be performed from the lookup table, and may perform the control sequence.

In one embodiment, each cube may store all of lookup tables corresponding to all of activities which may be performed by each cube. When a group/model/activity is specified, each cube may extract a control sequence to be performed from a corresponding lookup table, and may perform the control sequence.

Meanwhile, in order for one modular robot configured with N cubes to correctly perform a given activity, all of the N cubes need to perform a step motor control sequence at accurate timing. Accordingly, there is a need for a process of synchronizing the N cubes and a process of controlling, by each of the synchronized N cubes, its step motor. Hereinafter, such a process is more specifically described with reference to FIG. 9.

Figure 9:
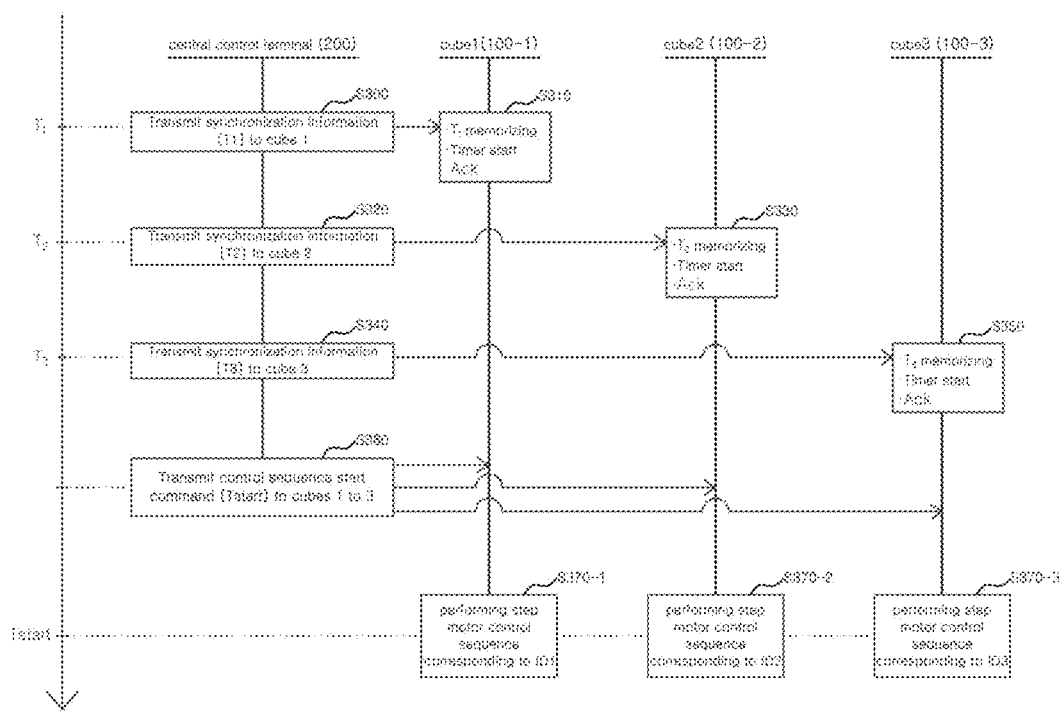
FIG. 9 is a diagram illustrating a synchronization process between each cube type unit robot and the central control terminal.

FIG. 9 is a diagram illustrating synchronization and activity execution processes performed by each cube type unit robot and the central control terminal. In FIG. 9, steps are illustrated in a timeline based on a timer that operates in the central control terminal 200. Meanwhile, the processes of FIG. 9 are described based on a modular robot configured with three cubes.

Referring to FIG. 9, the central control terminal 200 may transmit synchronization information to each cube. In this case, each of piece of synchronization information may include transmission timing information of the corresponding synchronization information based on a timer operating in the central control terminal 200.

More specifically, the central control terminal 200 may transmit synchronization information to the first cube 100-1 at timing $T_1$ (S300). The synchronization information may include information on the timing $T_1$ at which the corresponding synchronization information is transmitted.

The first cube 100-1 that has received the synchronization information may memorize the timing $T_1$ at which the synchronization information is transmitted, may start its own timer, and may then transmit an acknowledgement signal Ack to the central control terminal (S310).

Furthermore, the central control terminal 200 may transmit synchronization information to the second cube 100-2 at timing $T_2$ (S320). The synchronization information may include information on the timing $T_2$ at which the corresponding synchronization information is transmitted.

The second cube 100-2 that has received the synchronization information may memorize the timing $T_2$ at which the synchronization information is transmitted, may start its own timer, and may then transmit an acknowledgement signal Ack to the central control terminal (S330).

Furthermore, the central control terminal 200 may transmit synchronization information to the third cube 100-3 at timing $T_3$ (S340). The synchronization information may include information on the timing $T_3$ at which the corresponding synchronization information is transmitted.

The third cube 100-3 that has received the synchronization information may memorize the timing $T_3$ at which the synchronization information is transmitted, may start its own timer, and may then transmit an acknowledgement signal Ack to the central control terminal (S330).

After receiving up to the last Ack, the central control terminal 200 may transmit a control sequence start command to the first cube to third cubes 100-1 to 100-3. In this case, the control sequence start command may include information on start timing $T_{start}$ calculated based on the timer operating in the central control terminal 200.

The central control terminal 200 determines, as the start timing $T_{start}$, timing after a given period from timing at which the last Ack is received. In this case, the central control terminal 200 determines the start timing $T_{start}$ by sufficiently considering a time taken for a signal/data to be transmitted to each cube through a wireless communication. The central control terminal 200 may determine the start timing $T_{start}$ with a sufficient time margin so that the start timing $T_{start}$ can be reached after the control sequence start command is transmitted to all of the cubes.

Meanwhile, the cubes have been synchronized based on the timer of the central control terminal 200, and thus each of the cubes can be aware of whether the start timing $T_{start}$ included in the control sequence start command has been reached using its own timer and timing included in the synchronization information received by each cube, at which the synchronization information is transmitted. Accordingly, at the start timing $T_{start}$, each cube starts to execute a step motor control sequence corresponding to a unique ID number previously assigned thereto (S370-1, S370-2, S370-3).

Meanwhile, a user may customize a modular robot to operate in a desired manner by directly fabricating a step motor control sequence to be executed by each cube and developing a new activity or modifying the existing defined step motor control sequence. To this end, the central control terminal 200 may provide a UI which enables a user to write/modify a step motor control sequence.

Meanwhile, as described above, the modular robot system according to one embodiment of the present invention may be configured with only N cubes without a separate central control terminal. Any one of the N cubes may operate in the self mode in which the cube acts as a central control terminal. Hereinafter, the robot system operating in the self mode described based on contents different from those of the external control mode. Hereinafter, contents redundant with those of the external control mode are described in brief or a detailed description thereof is omitted.

Figure 10A:
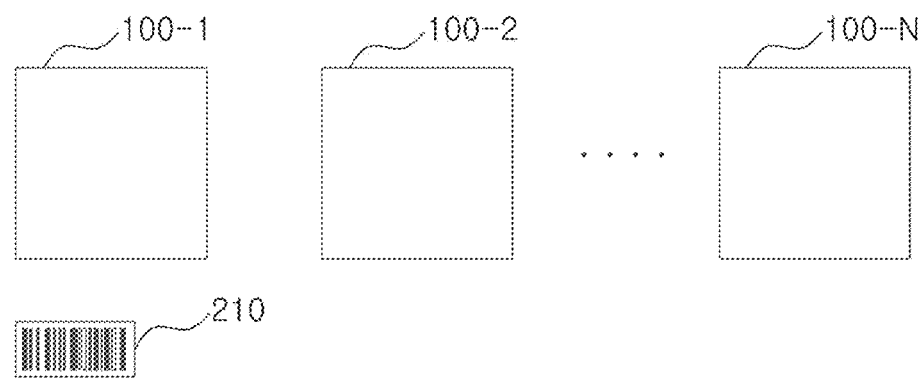
FIG. 10A and FIG. 10B are diagrams illustrating a process of selecting any one of a plurality of cubes as a central control cube according to one embodiment of the present invention.
Figure 10B:
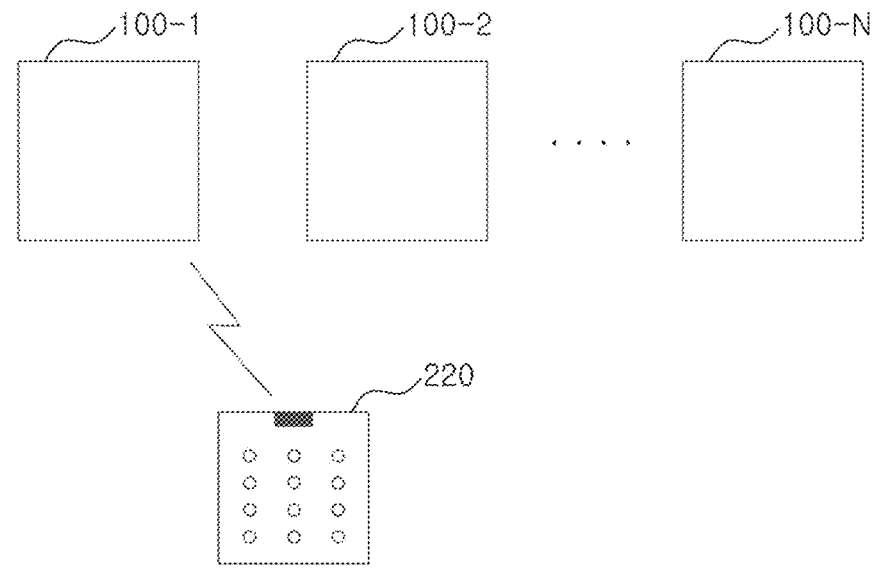

FIGS. 10A and 10B are diagrams illustrating a process of selecting any one of N cubes as a central control cube according to one embodiment of the present invention.

First, referring to FIG. 10A, a user may select any one (e.g., 100-1) of the N cubes as a central control cube by making the corresponding cube 100-1 recognize a recording medium 210 in which given information is written.

Each of the cubes 100-1 to 100-N basically operates as a peripheral cube, but a mode of each cube may switch to a mode in which the cube operates as a central control cube when the cube recognizes the information written in the recording medium 210. In order to change the mode, a corresponding cube may be booted again.

In one embodiment, the information may be encoded in a code form and written in the recording medium 210.

In one embodiment, the information may be written in the form of barcode or a QR code, but the present invention is not limited thereto. The information may be encoded in various manners. The encoded information may be printed on the recording medium 210. According to an embodiment, the recording medium 210 may be formed using various materials, such as paper and plastic.

In another embodiment, the recording medium 210 may have a form of a chip or memory in which the information is stored. For example, the recording medium 210 may be a USB memory.

In another embodiment, the recording medium 210 may be an RFID tag in which the information is stored.

Each of the N cubes may include recognition device 152 capable of recognizing the information written in the recording medium 210. A method of implementing the recognition device 152 may be dependent on a recording medium. For example, if a barcode is written in the recording medium 210, the recognition device 152 may be a barcode reader device. If the recording medium 210 is an RFID tag, the recognition device 152 may be an RFID reader device.

In one embodiment, the information written in the recording medium 210 may include group information, model information, and activity information. A cube operating as a central control cube may obtain group information, model information, and activity information written in the recording medium 210, and may use the information to control another peripheral cube.

In addition, various pieces of information may be further written in the recording medium 210. In another embodiment, the information written in the recording medium 210 may also include a step motor control sequence for defining an activity.

FIG. 10B is a diagram illustrating an example in which a central control cube is selected using a remote controller.

Referring to FIG. 10B, a user may transmit, to any one (e.g., 100-1) of N cubes, a radio signal including given information using a remote controller 220. For example, the radio signal may be an infrared communication signal.

The remote controller 220 may include a button through which a user can input information. The user may input information using the button. The remote controller 220 may transmit, to a cube, the information input by the user through a radio signal.

In FIG. 10B, each cube may include the recognition device 152 capable of receiving a radio signal. If the radio signal is an infrared communication signal, the recognition device 152 may be an infrared sensor.

The cube 100-1 that has received the radio signal from the remote controller 220 may change its mode to a mode in which the cube operates as a central control cube.

The information included in the radio signal may include group information, model information, and activity information. The central control cube 100-1 may recognize the information included in the radio signal.

For example, when a user sequentially presses 020317 in the remote controller 220 and presses a confirmation button, this may mean a No. 02 group, a No. 03 model, and a No. 17 activity. The central control cube 100-1 may recognize that a modular robot including the central control cube 100-1 has to perform the No. 17 activity as the No. 03 model of the No. 02 group.

After the central control cube is selected, the central control cube may perform a process of being connected with the remaining peripheral cubes. This is described with reference to FIG. 11A.

Figure 11A:
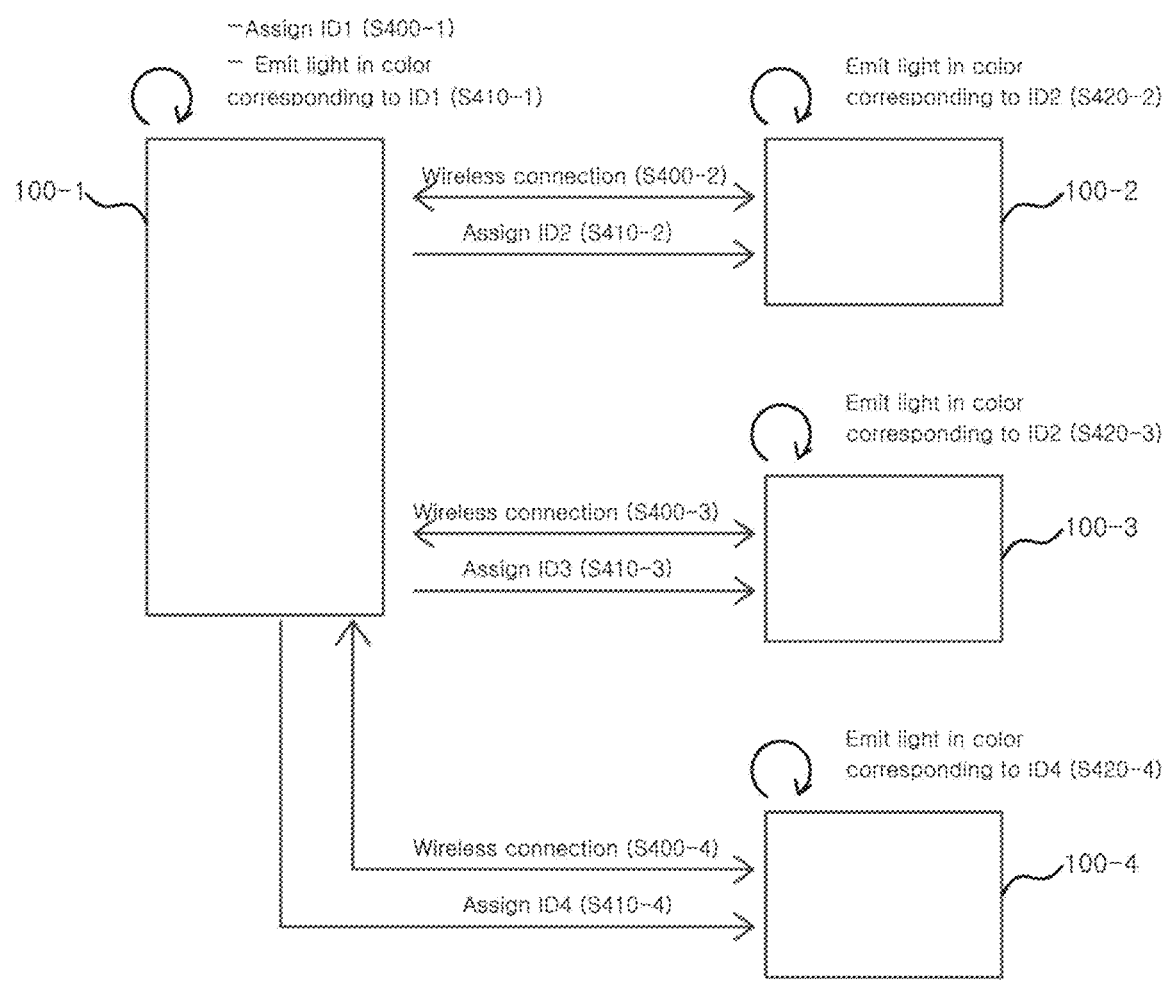
FIG. 11A is a diagram illustrating a process of a central control cube and peripheral cubes being connected.

FIG. 11A is a diagram illustrating a process of a central control cube and peripheral cubes being connected. FIG. 11A illustrates an example in which four cubes are connected and the first cube 100-1 is a central control cube.

As described above, a unique color may be assigned to each unique ID number. For example, red may be previously assigned to an ID number 1, blue may be previously assigned to an ID number 2, green may be previously assigned to an ID number 3, and yellow may be previously assigned to an ID number 4. The control unit 120 of each cube may previously store such correspondence information. It is assumed that in FIG. 11A, a color corresponding to an ID number has been assigned as described above.

Referring to FIG. 11A, the central control cube 100-1 may assign a unique ID number 1 thereto (S400-1), and may emit light having a color corresponding to the unique ID number 1 (S410-1).

Meanwhile, the central control cube 100-1 may flicker in red, that is, a color corresponding to the unique ID number 1, until all of peripheral cubes are connected, and may be turned on in red without flickering after all of necessary peripheral cubes are connected.

The central control cube 100-1 may be wirelessly connected to the remaining peripheral cubes 100-2 to 200-4 using a given wireless communication method (e.g., Bluetooth).

More specifically, the central control cube 100-1 may be wirelessly connected to the second cube 100-2 (S400-2). Thereafter, the central control terminal 200 may assign the unique ID number 2 to the cube (i.e., the second cube 100-2) that is first connected thereto (S410-2). The second cube 100-2 to which the unique ID number 2 is assigned may emit light in blue, that is, a color corresponding to the assigned unique ID number 2 (S420-2).

Furthermore, the central control cube 100-1 and the third cube 100-3 may be wirelessly connected using a wireless communication method (e.g., Bluetooth) (S400-3).

Thereafter, the central control terminal 200 may assign the unique ID number 3 to the cube (i.e., the third cube 100-3) that is second connected thereto (S410-3). The third cube 100-3 to which the unique ID number 3 is assigned may emit light in green, that is, a color corresponding to the unique ID number 3 (S420-3).

Meanwhile, the central control terminal 200 and the fourth cube 100-4 may be wirelessly connected using a wireless communication method (e.g., Bluetooth) (S400-4).

Thereafter, the central control terminal 200 may assign the unique ID number 4 to the cube (i.e., the fourth cube 100-3) that is third connected thereto (S410-4). The fourth cube 100-3 to which the unique ID number 4 is assigned may emit light in a color corresponding to the unique ID number 4 (S420-4). For example, the fourth cube 100-4 may emit light having a yellow color corresponding to the ID number 4.

FIG. 11B is a flowchart illustrating a process of selecting a central control cube and connecting the central control cube and peripheral cubes from a viewpoint of the central control cube. FIG. 11B illustrates an example in which the cube 100-1 is selected as a central control cube.

Referring to FIG. 11B, any one (100-1) of N cubes may recognize a recording medium (S500). The cube 100-1 may obtain information written in the recording medium (S510). In the example of FIG. 11B, the cube 100-1 may obtain group information, model information and activity information from the recording medium.

Furthermore, the cube 100-1 that has recognized the recording medium may change its mode to a mode in which the cube operates as a central control cube (S520).

Meanwhile, the central control cube 100-1 may assign a unique ID number thereto, and may emit, through a light-emitting area, light having a color corresponding to the assigned unique ID number (S530).

Referring to FIG. 11B, if the group information is i (wherein i is an integer where 1<=i<=N), the central control terminal 200 may determine whether the number of peripheral cubes now connected thereto is i−1 (S540), and may wait for a wireless connection with a new cube if the number of peripheral cubes now connected thereto is not i−1 (S550).

When being wirelessly connected to a new cube, the central control terminal 200 may assign a new unique ID number to the peripheral cube that is newly wirelessly connected thereto (S560, S570).

Meanwhile, the peripheral cube that is wirelessly connected to the central control cube 100-1 and to which the unique ID number is assigned may emit, through a light-emitting area, light having a color corresponding to the assigned unique ID number. This has been described above with reference to FIG. 11A.

The central control cube 100-1 may be wirelessly connected to the (i−1) cubes by repeating such a process.

After being wirelessly connected to the (i−1) cubes, the central control cube 100-1 may perform a given control process that enables an activity to be performed by the modular robot (S580).

Figure 12:
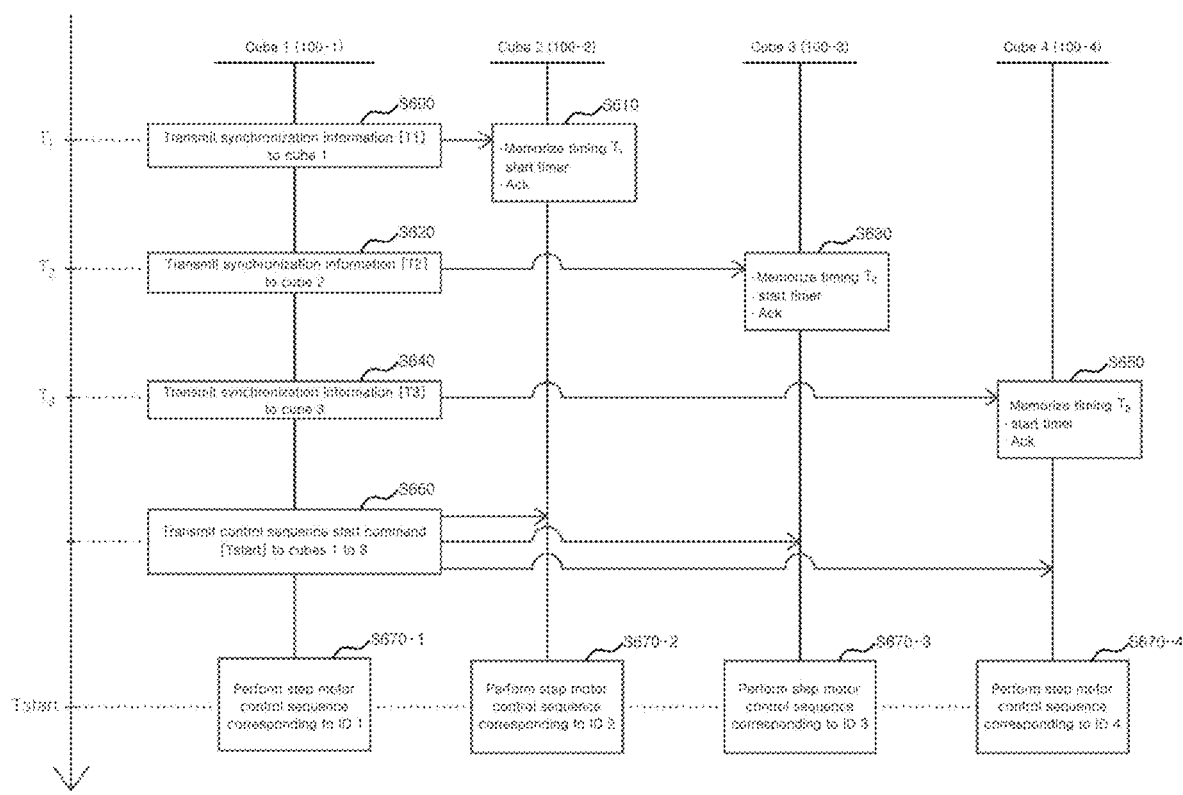
FIG. 12 is a flowchart illustrating a process of synchronizing cubes and executing an activity on the basis of a central control cube.

Hereinafter, a process of synchronizing cubes and executing an activity on the basis of a central control cube is described with reference to FIG. 12. In FIG. 12, it is assumed that the first cube 100-1 has been selected as the central control cube. Meanwhile, in FIG. 12, steps are illustrated in a timeline based on a timer operating in the central control cube 100-1. Meanwhile, the process of FIG. 12 is described based on a modular robot configured with four cubes.

Referring to FIG. 12, the central control cube 100-1 may transmit synchronization information to the second cube 100-2 at timing $T_1$ (S600). The synchronization information may include information on the timing $T_1$ at which the corresponding synchronization information is transmitted.

The second cube 100-1 that has received the synchronization information may memorize the timing $T_1$ at which the synchronization information is transmitted, may start its own timer, and may then transmit an acknowledgement signal Ack to the central control terminal (S610).

Furthermore, the central control cube 100-1 may transmit synchronization information to the third cube 100-3 at timing $T_2$ (S620). The synchronization information may include information on the timing $T_2$ at which the corresponding synchronization information is transmitted.

The third cube 100-3 that has received the synchronization information may memorize the timing $T_2$ at which the synchronization information is transmitted, may start its own timer, and may then transmit an acknowledgement signal Ack to the central control terminal (S630).

Furthermore, the central control cube 100-1 may transmit synchronization information to the fourth cube 100-4 at timing $T_3$ (S640). The synchronization information may include information on the timing $T_3$ at which the corresponding synchronization information is transmitted.

The fourth cube 100-4 that has received the synchronization information may memorize the timing $T_3$ at which the synchronization information is transmitted, may start its own timer, and may then transmit an acknowledgement signal Ack to the central control terminal (S630).

After receiving up to the last Ack, the central control cube 100-1 may transmit a control sequence start command to the second cube to the fourth cube 100-2 to 100-4. In this case, the control sequence start command may include information on start timing $T_{start}$ calculated based on a timer operating in the central control cube 100-1.

The central control terminal 200 determines, as the start timing $T_{start}$, timing after a given period from timing at which the last Ack is received. In this case, the central control terminal 200 determines the start timing $T_{start}$ by sufficiently considering a time taken for a signal/data is transmitted to each cube through a wireless communication. The central control cube 100-1 may determine the start timing $T_{start}$ with a sufficient time margin so that the start timing $T_{start}$ can be reached after the control sequence start command is transmitted to all of the cubes.

Meanwhile, the cubes have been synchronized based on the timer of the central control cube 100-1, and thus each of the cubes can be aware of whether the start timing $T_{start}$ included in the control sequence start command has been reached using its own timer and timing included in the synchronization information received by each cube, at which the synchronization information is transmitted. Accordingly, at the start timing $T_{start}$, each cube starts to perform a step motor control sequence corresponding to a unique ID number previously assigned thereto (S670-1 to S670-4).

The description of the present invention is illustrative, and a person having ordinary knowledge in the art to which the present invention pertains will understand that the present invention may be easily modified in other detailed forms without changing the technical spirit or essential characteristic of the present invention. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The present invention may be used in a modular robot system.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A modular robot system comprising N cube type unit robots where N is an integer equal to or greater than 2, wherein:
   any one of the N cube type unit robots acts as a central control terminal;
   the cube type unit robot acting as the central control terminal is configured to assign a different unique ID number to each of the N cube type unit robots;
   each of the N cube type unit robots comprises:
   a housing having a cube shape;
   a step motor installed within the housing;
   a control unit installed within the housing to control the step motor,
   a mounting groove, on which a rotating body rotated by a rotation shaft of the step motor is mounted, formed in one side of the housing; and
   a plurality of connection grooves, each having a same shape, formed on all sides of the housing except for the one side in which the mounting groove is formed;
   each cube type unit robot is connected to another cube type unit robot through a connection body mounted on the connection groove; and
   the control unit is configured to perform a step motor control sequence corresponding to the unique ID number of each cube type unit robot among predefined N step motor control sequences, where N unique ID numbers are transmitted to the respective N cube type unit robots and the predefined N step motor control sequences have a one-to-one correspondence with the N cube type unit robots.

2. The modular robot system of claim 1, wherein:
   each of the N cube type unit robots further comprises a recognition device configured to recognize information stored in a given recording medium, and
   when the recording medium is recognized by any one of the recognition devices included in the N cube type unit robots, a cube type unit robot comprising the corresponding recognition device acts as the central control terminal.

3. The modular robot system of claim 1, wherein:
   each of the N cube type unit robots further comprises a recognition device configured to recognize information transmitted by an external remote controller, and
   when the information transmitted by the remote controller is recognized by any one of the recognition devices included in the N cube type unit robots, a cube type unit robot comprising the corresponding recognition device acts as the central control terminal.

4. The modular robot system of claim 1, wherein:
   the cube type unit robot further comprises a light-emitting body which emits light through a light-emitting area formed in the housing, and
   the control unit is configured to control the light-emitting body so that light having a color corresponding to a unique ID number assigned to the cube type unit robot is emitted through the light-emitting area.

5. The modular robot system of claim 1, wherein the control unit is configured to:
   store a lookup table including a descriptor of each of the predefined N step motor control sequences,
   extract, from the stored lookup table, a step motor control sequence descriptor corresponding to a unique ID number of the cube type unit robot, and
   perform the step motor control sequence based on the extracted step motor control sequence descriptor.

6. The modular robot system of claim 5, wherein the descriptor of each of the N step motor control sequences comprises a list of a number of pulses per unit time.

7. The modular robot system of claim 1, wherein:
   the cube type unit robot acting as the central control terminal is configured to transmit, to each of the N cube type unit robots, a step motor control sequence descriptor corresponding to a unique ID number corresponding to the corresponding cube type unit robot, and
   the control unit is configured to perform the step motor control sequence based on the step motor control sequence descriptor transmitted to the cube type unit robot.

8. The modular robot system of claim 1, wherein:
   the cube type unit robot acting as the central control terminal is configured to transmit synchronization information to each of the N cube type unit robots, and transmit a control sequence start command to each of the N cube type unit robots after transmitting synchronization information to all of the N cube type unit robots,
   the synchronization information comprises synchronization reference timing measured based on a timer operating in the central control terminal,
   the control sequence start command comprises start timing calculated based on the timer operating in the central control terminal, and
   the control unit is configured to start its own timer when the synchronization information is transmitted to the cube type unit robot, and perform the step motor control sequence at start timing included in the control sequence start command using synchronization reference timing included in the synchronization information and the its own timer when the control sequence start command is transmitted to the cube type unit robot.

* * * * *